(12) United States Patent
Shin et al.

(10) Patent No.: US 11,422,368 B2
(45) Date of Patent: Aug. 23, 2022

(54) HEAD-UP DISPLAY APPARATUS AND MANUFACTURING MEIHOD FOR VEHICLE

(71) Applicant: HYUNDAI MOBIS CO., LTD., Seoul (KR)

(72) Inventors: Yu Jin Shin, Seongnam-si (KR); Byung Ki Kim, Yongin-si (KR); Chan Seo Goo, Suwon-si (KR); Seok Bong Kang, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/245,747

(22) Filed: Apr. 30, 2021

(65) Prior Publication Data

US 2021/0349314 A1 Nov. 11, 2021

(30) Foreign Application Priority Data

May 8, 2020 (KR) .......................... 10-2020-0055031

(51) Int. Cl.
 *G02B 27/01* (2006.01)
 *B60K 35/00* (2006.01)
 *G02B 7/182* (2021.01)

(52) U.S. Cl.
CPC .......... *G02B 27/0149* (2013.01); *B60K 35/00* (2013.01); *G02B 7/1821* (2013.01); *G02B 27/0179* (2013.01); *B60K 2370/1529* (2019.05); *B60K 2370/23* (2019.05)

(58) Field of Classification Search
CPC .. G02B 27/0149; G02B 7/1821; G02B 7/182; G02B 7/1827; B60K 35/00; B60K 2370/1529
See application file for complete search history.

(56) References Cited

U.S. PATENT DOCUMENTS

2020/0338944 A1\* 10/2020 Henon ...................... B60R 1/02

\* cited by examiner

*Primary Examiner* — Ryan D Howard
(74) *Attorney, Agent, or Firm* — DLA Piper LLP (US)

(57) ABSTRACT

A vehicle head-up display apparatus and manufacturing method thereof are disclosed. The present disclosure in some embodiments provides a vehicle head-up display apparatus including a lower case, an aspherical mirror, a plurality of plate springs, and a screen. The aspherical mirror has opposite ends respectively formed with spherical mounts that rotatably attach the aspherical mirror to the lower case. Each of the plate springs are respectively positioned above one of the spherical mounts to limit displacements of the spherical mounts. The screen includes at least one or more combining holes configured to be coupled with the plate springs and is configured to be coupled with the lower case. Here, the lower case includes a plurality of reception blocks configured to seat the spherical mounts from underneath and formed in a shape conformable to the spherical mounts to allow no clearance against the spherical mounts. At least one of the reception blocks include a support unit wherein one or more the support units are inclined toward a rotation axis of the aspherical mirror.

16 Claims, 7 Drawing Sheets

(b)

HEAD-UP DISPLAY APPARATUS AND MANUFACTURING METHOD FOR VEHICLE

CROSS-REFERENCE TO RELATED APPLICATIONS

This application is based on, and claims priority from, Korean Patent Application Number 10-2020-0055031, filed May 8, 2020, the disclosure of which is incorporated by reference herein in its entirety.

TECHNICAL FIELD

The present disclosure in some embodiments relates to a head-up display apparatus for vehicles and a manufacturing method thereof. More specifically, the present disclosure relates to a head-up display apparatus and a manufacturing method thereof for vehicles wherein the head-up display apparatus has an aspherical mirror with its rotation axis configured and positioned optimally.

BACKGROUND

The statements in this section merely provide background information related to the present disclosure and do not necessarily constitute prior art.

The automobile market is developing in favor of more intelligent vehicles equipped with advanced information technology. In particular, products are being released for supporting driving stability and driver's convenience, of which a head-up display (HUD) for vehicles is drawing attention.

The head-up display is an apparatus that displays an image including vehicle speed, fuel level, and directional information on a vehicle windshield or front window. The head-up display apparatus is generally configured to reflect head-up display information projected from a picture graphic unit (PGU) through an aspherical mirror and display it on a windshield. The head-up display apparatus is also configured to be responsive to changing conditions including the driver's eye level for rotationally adjusting the aspherical mirror by its reflection angle, and as a result, adjusting the elevation of the information displayed on the windshield.

However, the aspherical mirror when rotating is subject to vibration or external shock caused by driving, leading to an altered rotation axis thereof, thus dislocating information displayed on the windshield or rendering the same out of focus.

Related prior art for solving this drawback includes Japanese Patent Application No. JP, 2017-099314 entitled 'head-up display device'.

However, this and other prior art solutions are not able to prevent clearance from occurring in a fixed portion of the aspherical mirror when impacted by a large external force. Moreover, conventional head-up display apparatuses suffer from manufacturing cost increase from using a large number of parts for fixing the aspherical mirror.

SUMMARY

According to at least one embodiment, the present disclosure provides a head-up display apparatus for a vehicle, including a lower case, an aspherical mirror, a plurality of plate springs, and a screen. The aspherical mirror has opposite ends respectively formed with spherical mounts that rotatably attach the aspherical mirror to the lower case. Each of the plate springs are respectively positioned above one of the spherical mounts to limit displacements of the spherical mounts. The screen includes at least one or more combining holes configured to be coupled with the plate springs and is configured to be coupled with the lower case. Here, the lower case includes a plurality of reception blocks configured to seat the spherical mounts from underneath and formed in a shape conformable to the spherical mounts to allow no clearance against the spherical mounts. At least one of the reception blocks include a support unit wherein one or more the support units are inclined toward a rotation axis of the aspherical mirror.

The reception blocks may be in vertical alignment with the plate springs.

The shape conformable to the spherical mounts may include a shape of a V-shaped block.

The spherical mounts may be limited from being displaced in x-axis, y-axis, and z-axis directions by the reception blocks and the plate springs.

The lower case may include one or more vertical fastening grooves having a height greater than a diameter of each of the spherical mounts and may be configured to make screw connections with the screen.

Each of the plate springs may protrude in a direction to be in contact with each of the spherical mounts by a difference between the height of the vertical fastening groove and the diameter of each spherical mount, thereby fixing each spherical mount.

Additionally, each of the plate springs may provide a snap-fit fastening structure detachably attaching the plate springs to the combining holes of the screen.

Each of the plate springs may each include a pushing unit configured to fix the spherical mount, and a hook unit configured to snap-fit fasten the plate spring to the combining hole.

The head-up display apparatus may further include a driving unit connected to the lower case and linked with the aspherical mirror to rotate the aspherical mirror, and a control unit configured to control the driving unit to reposition a head-up display of information by rotating the aspherical mirror.

The driving unit may further include a step motor configured to be driven under control of the control unit, a lead screw linked with the step motor and configured to convert a rotational motion of the step motor into a linear motion, and a rotation link unit linked with the aspherical mirror and the lead screw and configured to rotate the aspherical mirror.

Another embodiment of the present disclosure provides a method of manufacturing a head-up display apparatus for a vehicle, including forming an aspherical mirror with spherical mounts at opposite ends of the aspherical mirror that rotatably attach the aspherical mirror to a lower case, forming a plurality of reception blocks in the lower case each having a shape conformable to the spherical mounts to allow no clearance against the spherical mounts, forming one or more vertical fastening grooves in the lower case each having a height greater than a diameter of each of the spherical mounts, seating the spherical mounts in the reception blocks, coupling a plurality of plate springs with a screen at one or more combining holes formed in the screen, and coupling the screen to which the plate springs are coupled with the vertical fastening grooves by screw connections. Here, the plate springs provide a predetermined bias limiting the spherical mounts from being displaced.

The forming of the reception blocks in the lower case to have a shape conformable to the spherical mounts may include forming a support unit in at least one of the reception blocks, one or more of the support units being inclined toward a rotation axis of the aspherical mirror.

The forming of the reception blocks in the lower case to have a shape conformable to the spherical mounts may include forming the shape conformable to the spherical mounts into a V-shaped block.

The coupling of the plate springs with the combining holes of the screen may include detachably attaching the plate springs to the combining holes of the screen to establish a snap-fit fastening structure.

The coupling of the screen to which the plate springs are coupled with the vertical fastening grooves by screw connections may include coupling the reception blocks in vertical alignment with the plate springs.

The coupling of the screen to which the plate springs are coupled with the vertical fastening grooves by screw connections may include arranging each of the plate springs to protrude in a direction to be in contact with each of the spherical mounts by a difference between the height of the vertical fastening groove and the diameter of each spherical mount, thereby fixing each spherical mount.

Figure 1:
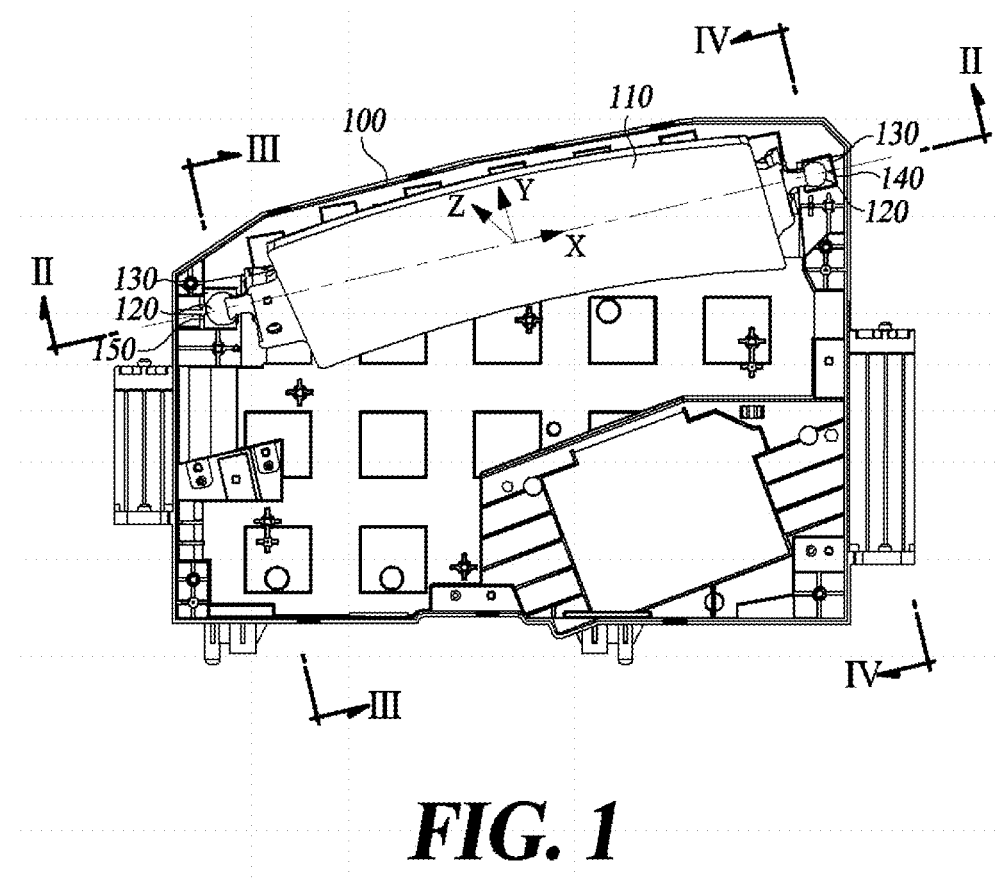
FIG. 1 is a diagram illustrating an example manner in which an aspherical mirror is attached to a lower case according to at least one embodiment of the present disclosure.

| REFERENCE NUMERALS | |
|---|---|
| 100: lowercase | 110: aspherical mirror |
| 120: spherical mount | 130: reception blocks |
| 140: support unit | 150: x-axis reference plane |
| 300: first seat | 400: second seat |
| 410: vertical fastening groove | 500: screen |
| 510: plate spring | 600: combining hole |
| 610: pushing unit | 620: hook unit |
| 700: screw connection | 800: driving unit |

| REFERENCE NUMERALS | |
|---|---|
| 810: step motor | 820: lead screw |
| 830: rotation link unit | 840: first link |
| 850: second link | |

DETAILED DESCRIPTION

To solve these issues, at least one embodiment of the present disclosure provides a head-up display apparatus for vehicles and a manufacturing method thereof, which provides an aspherical mirror with its rotation axis configured and positioned optimally to allow no clearance at attachment sites of the aspherical mirror and reduce the manufacturing cost of the head-up display apparatus.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a diagram illustrating an example manner in which an aspherical mirror 110 is attached to a lower case 100 according to at least one embodiment of the present disclosure.

Figure 2:
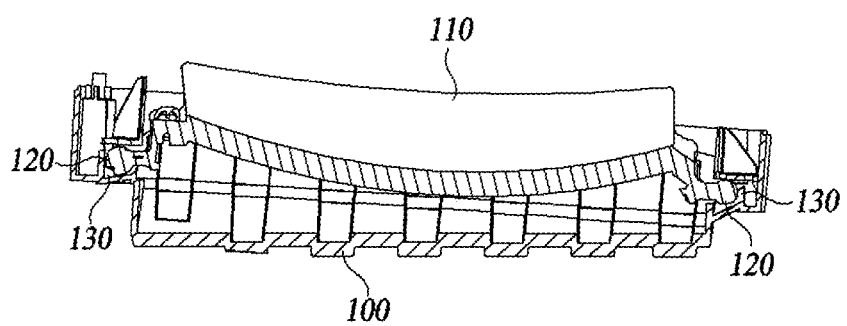
FIG. 2 is a cross-sectional view of the lower case and the aspherical mirror cut in the direction of the rotation axis (II-II) of the aspherical mirror.

FIG. 2 is a cross-sectional view of the lower case 100 and the aspherical mirror cut in the direction of the rotation axis (II-II) of the aspherical mirror 110.

Figure 3:
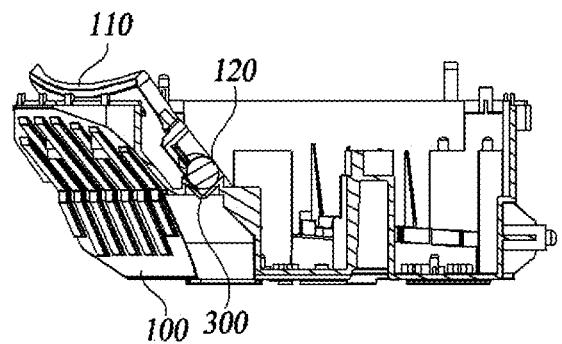
FIG. 3 is a cross-sectional view of the lower case and the aspherical mirror cut in the y-axis direction (III-III) of the aspherical mirror.

FIG. 3 is a cross-sectional view of the lower case 100 and the aspherical mirror 110 cut in the y-axis direction (III-III) of the aspherical mirror 110.

Figure 4:
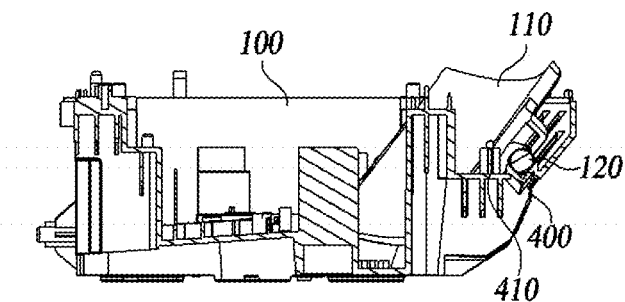
FIG. 4 is a cross-sectional view of the lower case and the aspherical mirror cut in the y-axis direction (IV-IV) of the aspherical mirror.

FIG. 4 is a cross-sectional view of the lower case 100 and the aspherical mirror 110 cut in the y-axis direction (IV-IV) of the aspherical mirror 110.

As shown in FIGS. 1 to 4, a vehicle head-up display apparatus according to at least one embodiment of the present disclosure includes a lower case 100, an aspherical mirror 110, vertical fastening grooves 410, and a plurality of reception blocks 130. Meanwhile, for convenience of explanation, it will be described below with reference to FIG. 9.

The lower case 100 is mounted inside a vehicle and serves to support the lower portion of the aspherical mirror 110 and protect the aspherical mirror 110 from external impact.

The aspherical mirror 110 has opposite ends formed with spherical mounts 120 respectively to be rotatably attached to the lower case 100. Therefore, the aspherical mirror 110 can be rotatably attached to the lower case 100. The head-up display apparatus is generally configured to reflect a head-up display image projected from a picture generation unit (PGU, not shown) on the aspherical mirror 110 by using a folding mirror (not shown) and render the image reflected by the aspherical mirror 110 to be displayed on a windshield (not shown). However, the head-up display apparatus may be configured to cause the PGU to directly project the head-up display image onto the aspherical mirror 110 and render the head-up display image reflected by the aspherical mirror 110 to be displayed on the windshield.

Taking account of the driver's eye level that changes, it is preferable to reposition the head-up display information to be displayed following the driver's eye level. Properly rotating the aspherical mirror 110 according to the driver's eye level can adjust the position at which the image is reflected on the windshield.

The vertical fastening grooves 410 are included in the lower case 100, and they may be configured to be integral with the lower case 100. The vertical fastening grooves 410 are configured to have a height greater than the diameter of the spherical mounts 120 and are located on both opposite sides of the lower case 100.

The reception blocks 130 are included in the lower case 100 and are disposed under the spherical mount 120 to allow the spherical mount 120 to be seated thereon. Additionally, the reception blocks 130 are formed in a shape conformable to the spherical mounts 120 to allow no clearance to form between the spherical mounts 120 and the reception blocks 130. The conformable shape is preferably a V-shape for allowing the spherical mounts 120 to be safely seated regardless of manufacturing tolerances. Further, with V-shaped reception blocks 130, the present disclosure can prevent the movement of the spherical mounts 120 in they and −z axis directions and their rotational movement in the β and γ directions while minimizing a possible occurrence of clearance against the spherical mounts 120.

The reception blocks 130 are classified by their positions into a first reception block 300 on a side of a drive unit 800 and a second reception block 400 on the opposite side of the drive unit 800.

At least one of the reception blocks 130 include a support unit 140 for supporting the spherical mount 120, and one or more of the support units 140 of the reception blocks 130 may be configured to be inclined toward the rotation axis of the aspherical mirror 110, that is, to be inclined in the x-axis direction. It is, however, preferable that the block on the opposite side of the driving part 800, that is, the second mounting block 400 has its support unit 140 configured to be inclined toward the first mounting block 300.

In particular, the left side of the first mounting block 300 is in contact with an x-axis reference plane 150 of the lower case 100, while the second mounting block 400 has its support unit 140 configured to be inclined toward the first mounting block 300, that is, to be inclined in the −x axis direction. Accordingly, since the aspherical mirror 110 is urged by gravity toward the x-axis reference surface 150, the aspherical mirror 110 can be prevented from moving in the x-axis direction. However, it not necessary that the second mounting block 400 on the opposite side of the driving part 800 alone be configured to incline, and the block to be inclined may be determined otherwise in consideration of the position of the driving unit 800 and the position of the x-axis reference plane 150.

Figure 5A:
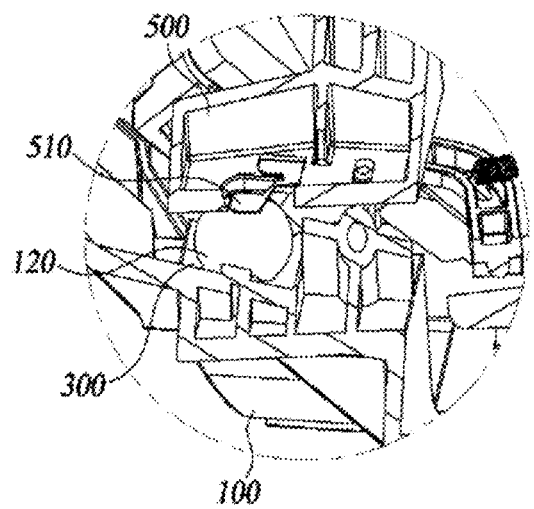
FIGS. 5A and 5B are cross-sectional views illustrating an example manner in which a screen and plate springs combined are coupled to a lower case with spherical mounts of the aspherical mirror interposed therebetween according to at least one embodiment of the present disclosure.
Figure 5B:
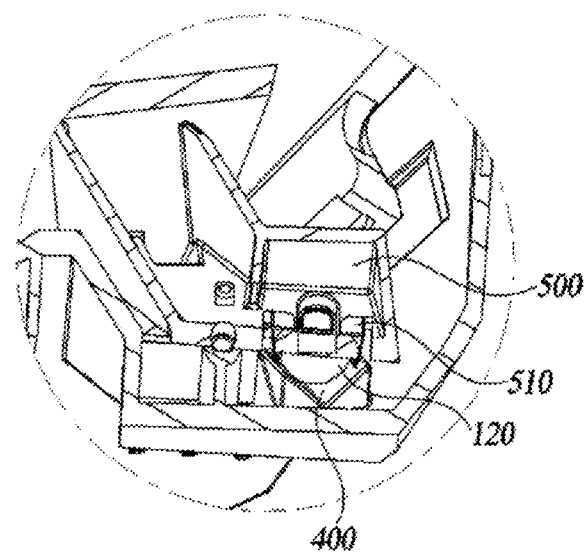

FIGS. 5A and 5B are cross-sectional views illustrating an example manner in which a screen 500 and a plurality of plate springs 510 combined are coupled to the lower case 100 with spherical mounts 120 of the aspherical mirror 110 interposed therebetween according to at least one embodiment of the present disclosure.

FIG. 5A is a cross-sectional view showing that the screen 500 and the lower case 100 are combined together and with the spherical mount 120, which is present on the side of the driving unit 800, interposed therebetween.

FIG. 5B is a cross-sectional view showing that the screen 500 and the lower case 100 are combined together and with the spherical mount 120, which is present on the opposite side of the driving unit 800, interposed therebetween.

Figure 6:
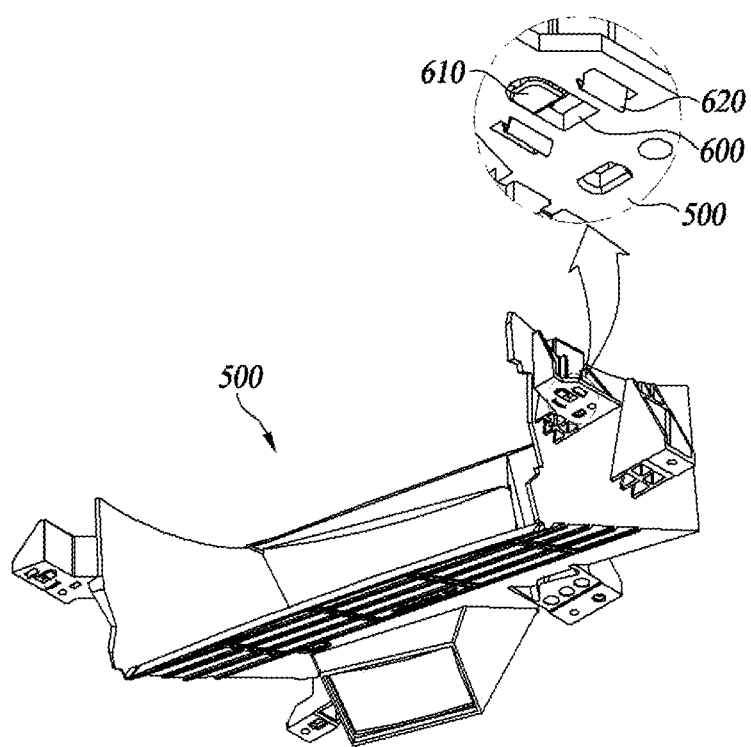
FIG. 6 is a diagram illustrating an example manner in which plate springs are mounted on a screen according to at least one embodiment of the present disclosure.

FIG. 6 is a diagram illustrating an example manner in which the plate springs 510 are mounted on the screen 500 according to at least one embodiment of the present disclosure.

Figure 7:
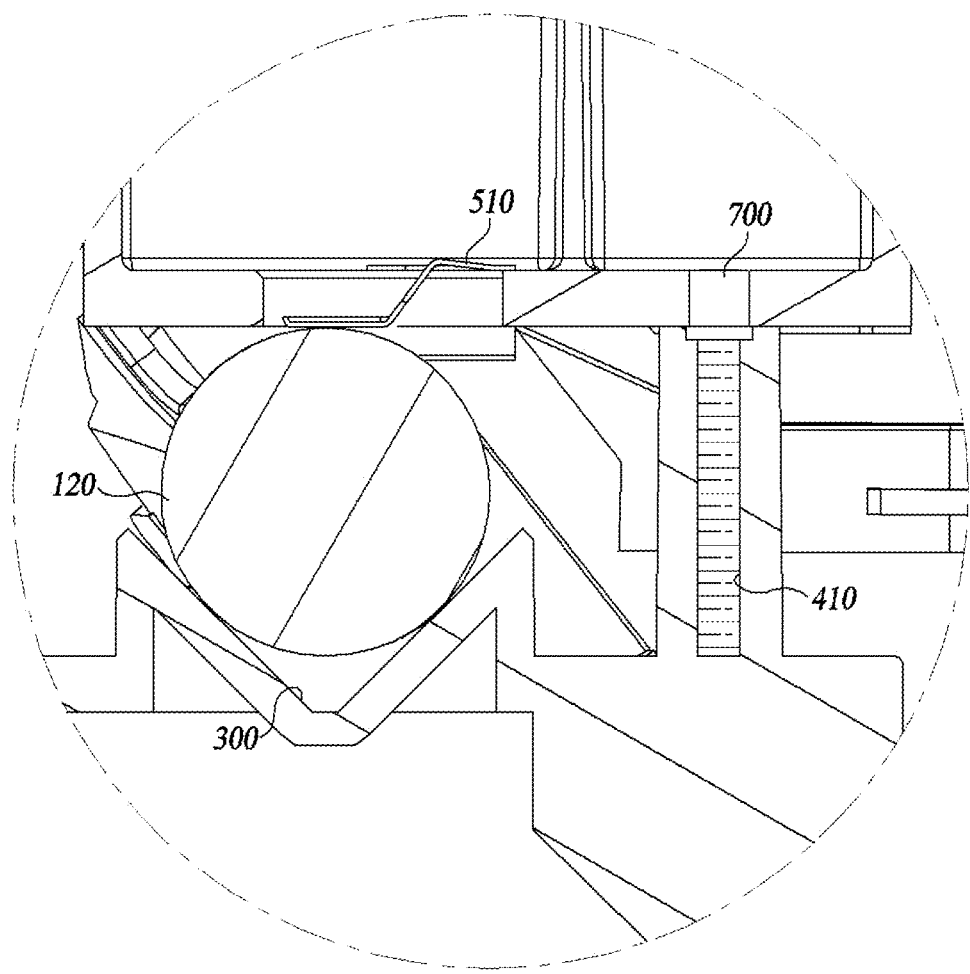
FIG. 7 is a cross-sectional view illustrating an example manner in which a spherical mount is fixed by a plate spring and a screw connection according to at least one embodiment of the present disclosure.

FIG. 7 is a cross-sectional view illustrating an example manner in which a spherical mount 120 is fixed by a plate spring 510 and a screw connection 700 according to at least one embodiment of the present disclosure.

As shown in FIGS. 5 to 7, the head-up display apparatus for a vehicle according to at least one embodiment of the present disclosure further includes all or some of the plate springs 510 and the screen 500.

The plate springs 510 are located above the spherical mounts 120 respectively and limit the displacement of the spherical mounts 120 with a predetermined holding force. This is to prevent the aspherical mirror 110 when rotating from causing the rotational axis of the aspherical mirror 110 to be shaken or from moving the spherical mounts 120 in the z-axis direction. Meanwhile, to prevent the aspherical mirror 110 from being moved in the z-axis direction, the plate springs 510 are preferably vertically aligned with the reception blocks 130.

Therefore, one or more of the support units 140 of the V-shaped reception blocks 130 is inclined in the rotation axis direction, that is, the −x axis direction, and the plate springs 510 depress the upper portions of the spherical mounts 120, thereby subjecting the aspherical mirror 110 to a holding force in the x-axis, y-axis and z-axis directions.

The screen 500 has combining holes 600 which are spaces for coupling with the plate springs 510, and it is coupled with the lower case 100. The screen 500 has one surface to which a folding mirror may be coupled for reflecting the image projected by the PGU on the aspherical mirror 110.

The coupling of the screen 500 with the lower case 100 is made by coupling both sides of the screen 500 to the vertical fastening grooves 410 of the lower case 100. Here, the coupling method preferably includes, but is not limited to, screw connections 700 to prevent the coupling from loosening easily.

As shown in FIG. 6, the plate springs 510 each provide a snap-fit fastening structure to be detachably attached to the combining hole 600 of the screen 500. For the snap-fit fastening structure, the plate spring 510 may include all or some of a pushing unit 610 and hook units 620.

These pushing units 610 serve to fix the spherical mounts 120 to the reception blocks 130. To fix the spherical mounts 120, the pushing units 610 protrude downward from the combining holes 600 of the screen 500 by a predetermined distance, and they are configured to directly contact the upper portions of the spherical mounts 120.

The hook units 620 are configured to enable the plate spring 510 to be snap-fit fastened to each combining hole 600 of the screen 500. The hook units 620 are each formed into a hook with a bent end to enable the plate spring 510 to be fastened to the combining hole 600 of the screen 500 in a snap-fit manner as well as to be detached therefrom.

As shown in FIG. 7, the spherical mount 120 is seated on the first reception block 300, and the plate spring 510 fixes the spherical mount 120 in the z-axis direction. On the other hand, in case of fixing the spherical mount 120 with the plate spring 510 alone, an application of a large external force may separate the spherical mount 120 from the first mounting block 300. Therefore, it is preferable to prevent the separation of the spherical mount 120 by increasing the binding force in the z-axis direction by fastening the screen 500 through the screw connection 700 into the vertical fastening groove 410 of the lower case 100.

On the other hand, the plate spring 510 protrudes toward the spherical mount 120 by the difference between the height of the vertical fastening groove 410 and the diameter of the spherical mount 120 until it comes into contact with the spherical mount 120. The protruding length of the plate spring 510 may be called an overlap, where the plate spring 510 fixes the spherical mount 120 with an elastic force proportional to the overlap. Therefore, to take advantage of the elastic force of the plate springs 510, the vertical fastening groove 410 is preferably configured to have a height greater than the diameter of the spherical mount 120.

As above, when the screen 500 with the plate springs 510 combined is screwed to the vertical fastening grooves 410 of the lower case 100, unless there is a sufficient impact applied to damage the screw connection 700, the spherical mounts 120 of the aspherical mirror 110 can move only as much as the overlap amount. Accordingly, the aspherical mirror 110 is restricted from movement in the x, y, and z-axis directions and rotation in the $\beta$ and $\gamma$ directions and is allowed to rotate exclusively in the $\alpha$ direction.

Figure 8A:
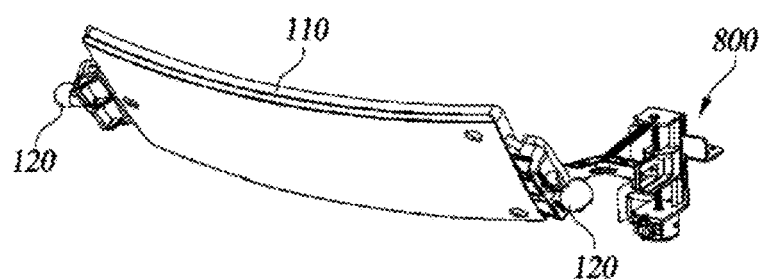
FIGS. 8A and 8B are diagrams illustrating a vehicle head-up display apparatus designed to have an aspherical mirror rotatable according to at least one embodiment of the present disclosure.
Figure 8B:
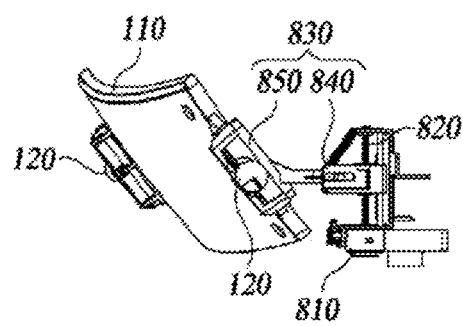

FIGS. 8A and 8B are diagrams illustrating a vehicle head-up display apparatus designed to have the aspherical mirror 110 rotatable according to at least one embodiment of the present disclosure.

FIG. 8A is an exploded view showing the aspherical mirror 110 and the driving unit 800 alone out of the head-up display apparatus for a vehicle according to at least one embodiment of the present disclosure.

FIG. 8B is a side view showing the aspherical mirror 110 and the driving unit 800 alone out of the head-up display apparatus for a vehicle according to at least one embodiment.

The vehicle head-up display apparatus according to at least one embodiment includes all or some of the driving unit 800 as shown in FIGS. 8A and 8B and a control unit (not shown).

The driving unit 800 is linked with the lower case 100 and the aspherical mirror 110 and is configured to rotate the aspherical mirror 110. The control unit controls the movement of the driving unit 800 to change the position at which the head-up display information is displayed according to the driver's eye level.

The driving unit 800 includes all or some of a step motor 810, a lead screw 820, and a rotation link unit 830 to rotate the aspherical mirror 110.

The step motor 810 is driven under the control of the control unit, and the lead screw 820 is linked with the step motor 810 to convert the rotational motion of the step motor 810 into linear motion. However, it is not necessary to rotate the aspherical mirror 110 by the control unit, and a vehicle driver may be allowed to manually adjust the aspherical mirror 110 while observing the elevation of the head-up display information.

The rotation link unit 830 is linked with the aspherical mirror 110 and the lead screw 820 so that the aspherical mirror 110 rotates according to the driving of the step motor 810. For example, the rotating link unit 830 may include a first link 840 that moves up and down according to the rotation of the lead screw 820 and a second link 850 that is connected to the first link 840 and rotates the aspherical mirror 110 according to the vertical movement of the first link 840. In this case, the first link 840 may be formed with a groove for allowing the second link 850 to move horizontally.

Therefore, when the driver's eye level is changed due to switching between drivers or seat height adjustment, the control unit calculates the position of the head-up display information suitable for the driver's eye level and rotates the aspherical mirror 110 for displaying the head-up display information at the calculated position. The driver's eye level information may be directly inputted by the driver or may be automatically detected by a separate eye level detection device (not shown) provided in the vehicle.

Figure 9:
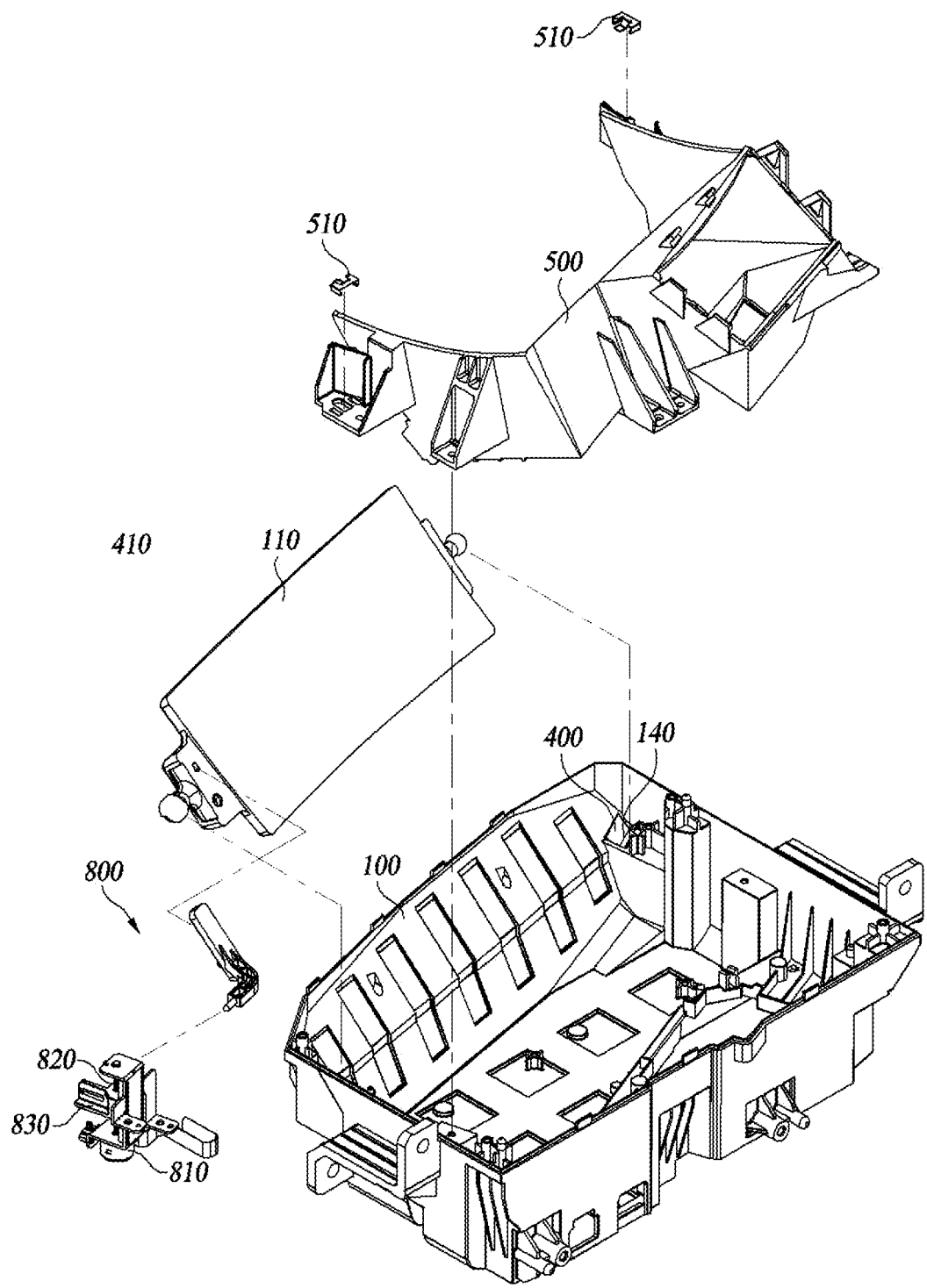
FIG. 9 is an exploded view of the components of a head-up display apparatus for a vehicle according to at least one embodiment of the present disclosure.

FIG. 9 is an exploded view of the components of a head-up display apparatus for a vehicle according to at least one embodiment of the present disclosure.

FIG. 9 shows a lower case 100 and an aspherical mirror 110 having both opposite ends formed with spherical mounts 120 for rotating the aspherical mirror 110. The lower case 100 is formed with reception blocks 130 (visible by numeral 400) having a shape conformable to the spherical mounts 120 for seating thereof while allowing no clearance to form against the spherical mounts 120. The reception blocks 130 include support units 140 respectively, and one or more of the support units 140 may be configured to be inclined toward the rotation axis of the aspherical mirror 110. The lower case 100 is further formed with vertical fastening grooves 410 capable of making screw connections 700 with a screen 500.

The screen 500 is formed with combining holes 600 to which plate springs 510 may be coupled, and the plate springs 510 may be coupled to the screen 500 in a detachable snap-fit structure. The screen 500 with the plate springs 510 combined may be coupled by the screw connections 700 to the vertical fastening grooves 410.

A driving unit 800 may be linked with the lower case 100 and the aspherical mirror 110 to rotate the latter.

As described above, by providing the reception blocks 130 with a shape conformable to the spherical mounts 120 for seating thereof while allowing no clearance to form therewith, the vehicle head-up display apparatus can be produced into the most optimized structural shape. Accordingly, when the aspherical mirror 110 when needs to be rotated according to the driver's eye level can do so with stability and prevent clearance from occurring due to an external force. Further, no additional parts are needed to prevent the movement of the aspherical mirror 110 in the x, y, and z axes and rotation in the $\beta$ and $\gamma$ directions, thereby reducing the manufacturing cost of the vehicle head-up display apparatus.

As described above, by optimizing the structure of the aspherical mirror and minimizing the components, the present disclosure according to some embodiments can prevent clearance from occurring at attachment sites of the aspherical mirror and reduce the manufacturing cost of the head-up display apparatus.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A head-up display apparatus for a vehicle, comprising:
a lower case;
an aspherical mirror having opposite ends respectively formed with spherical mounts that rotatably attach the aspherical mirror to the lower case;
a plurality of plate springs, each of the plate springs being respectively positioned above one of the spherical mounts to limit displacements of the spherical mounts; and
a screen including one or more combining holes configured to be coupled with the plate springs and configured to be coupled with the lower case,
wherein the lower case comprises:
a plurality of reception blocks configured to seat the spherical mounts from underneath and formed in a shape conformable to the spherical mounts to allow no clearance against the spherical mounts, at least one of the reception blocks comprising a support unit, wherein one or more of the support units are inclined toward a rotation axis of the aspherical mirror.

2. The head-up display apparatus of claim 1, wherein the reception blocks are configured to be in vertical alignment with the plate springs.

3. The head-up display apparatus of claim 1, wherein the shape conformable to the spherical mounts comprises a shape of a V-shaped block.

4. The head-up display apparatus of claim 3, wherein the spherical mounts are configured to be limited from being displaced in x-axis, y-axis, and z-axis directions by the reception blocks and the plate springs.

5. The head-up display apparatus of claim 1, wherein the lower case comprises:
one or more vertical fastening grooves having a height greater than a diameter of each of the spherical mounts and configured to make screw connections with the screen.

6. The head-up display apparatus of claim 5, wherein each of the plate springs is configured to protrude in a direction to be in contact with each of the spherical mounts by a difference between the height of the vertical fastening groove and the diameter of each spherical mount, thereby fixing each spherical mount.

7. The head-up display apparatus of claim 1, wherein each of the plate springs comprises a snap-fit fastening structure detachably attaching the plate springs to the combining holes of the screen.

8. The head-up display apparatus of claim 7, wherein each of the plate springs comprises:
a pushing unit configured to fix the spherical mount; and
a hook unit configured to snap-fit fasten the plate spring to the combining hole.

9. The head-up display apparatus of claim 1, further comprising:
a driving unit connected to the lower case and linked with the aspherical mirror, the driving unit being configured to rotate the aspherical mirror; and
a control unit configured to control the driving unit to reposition a head-up display of information by rotating the aspherical mirror.

10. The head-up display apparatus of claim 9, wherein the driving unit further comprises:

a step motor configured to be driven under control of the control unit;
a lead screw linked with the step motor and configured to convert a rotational motion of the step motor into a linear motion; and
a rotation link unit linked with the aspherical mirror and the lead screw and configured to rotate the aspherical mirror.

11. A method of manufacturing a head-up display apparatus for a vehicle, the method comprising:
forming an aspherical mirror with spherical mounts at opposite ends of the aspherical mirror that rotatably attach the aspherical mirror to a lower case;
forming a plurality of reception blocks in the lower case each having a shape conformable to the spherical mounts to allow no clearance against the spherical mounts;
forming one or more vertical fastening grooves in the lower case having a height greater than a diameter of each of the spherical mounts;
seating the spherical mounts in the reception blocks;
a plurality of coupling plate springs with a screen at one or more combining holes formed in the screen; and
coupling the screen to which the plate springs are coupled with the vertical fastening grooves by screw connections,
wherein the plate springs provide a predetermined bias limiting the spherical mounts from being displaced.

12. The method of claim 11, wherein the forming of the reception blocks in the lower case to have a shape conformable to the spherical mounts comprises forming a support unit in at least one of the reception blocks, one or more of the support units being inclined toward a rotation axis of the aspherical mirror.

13. The method of claim 11, wherein the forming of the reception blocks in the lower case to have a shape conformable to the spherical mounts comprises forming the shape conformable to the spherical mounts into a V-shaped block.

14. The method of claim 11, wherein the coupling of the plate springs with the combining holes of the screen comprises detachably attaching the plate springs to the combining holes of the screen to establish a snap-fit fastening structure.

15. The method of claim 11, wherein the coupling of the screen to which the plate springs are coupled with the vertical fastening grooves by screw connections comprises coupling the reception blocks in vertical alignment with the plate springs.

16. The method of claim 11, wherein the coupling of the screen to which the plate springs are coupled with the vertical fastening grooves by screw connections comprises arranging each of the plate springs to protrude in a direction to be in contact with each of the spherical mounts by a difference between the height of the vertical fastening groove and the diameter of each spherical mount, thereby fixing each spherical mount.

* * * * *